United States Patent [19]

Uehara

[11] Patent Number: 5,446,893

[45] Date of Patent: Aug. 29, 1995

[54] PROCESS DISPATCHING METHOD

[75] Inventor: Izushi Uehara, Tokyo, Japan

[73] Assignee: NEC Corporation, Tokyo, Japan

[21] Appl. No.: 164,555

[22] Filed: Dec. 10, 1993

[30] Foreign Application Priority Data

Dec. 10, 1992 [JP] Japan .................. 4-352231

[51] Int. Cl.⁶ .............................................. G06F 15/16
[52] U.S. Cl. ............................ 395/650; 364/DIG. 1;
364/228.1; 364/230.3; 364/238.4; 364/281.8
[58] Field of Search .......... 395/650; 364/200, DIG. 1

[56] References Cited

U.S. PATENT DOCUMENTS

4,463,420  7/1984  Fletcher ............................ 364/200
5,109,512  4/1992  Bahr et al. ........................ 395/650
5,276,848  1/1994  Gallagher et al. ................. 395/425

Primary Examiner—Thomas M. Heckler
Assistant Examiner—Majid A. Banankhah
Attorney, Agent, or Firm—Foley & Lardner

[57] ABSTRACT

A process dispatch method for use in a multiprocessor system in which each process mounts a cache memory is disclosed. When a process A is dispatched, all the processes in execution having the lowest priority are selected. If only one process is selected, the process A is dispatched to the processor executing this selected process. If a plurality of processes are selected and if the processors executing the selected processes include the processor which executed the process A immediately before, the process A is dispatched to this processor.

2 Claims, 7 Drawing Sheets

PROCESS DISPATCHING METHOD

BACKGROUND OF THE INVENTION

Technical Field to which the Invention Belongs

The present invention relates to a process dispatching method, and more particularly to a process dispatching method for use in a multiprocessor system in which each of a plurality of central processing units (CPUs) has a cache memory.

Definition of Terms

Before describing the prior art, key terms used in this specification will be defined.

A process control block (PCB) is the set of information necessary for the execution off a process, and is stored in the main memory unit. Information stored in a PCB includes the priority of the process. The detailed structure of a PCB will be described in detail elsewhere in this specification.

A running state is one state of a process, in which the process is being executed on a processor.

A ready state is another state of a process, in which the process can be immediately executed. A process in a ready state waits for a processor to enter an idle state in a ready queue.

A waiting state is still another state of a process, in which the process is waiting for the occurrence of some event.

A re-dispatch is to bring a process into a running state from a waiting state and to dispatch it again to one of the processors.

A process swap is to bring a process in a running state on a processor into a ready state or a waiting state and to dispatch another process to this processor.

Prior Art

Next will be described the characteristics of a multiprocessor system in which each processor has its own a cache memory. In a multiprocessor system, each processor is provided with a cache memory to facilitate quick memory access. However, the installation of cache memories multiprocessor systems gives rise to the following problems which can be explained with reference to the following hypothetical multiprocessor system and its processing sequence. The hypothetical multiprocessor system has processors X through Z. Processor X through Z have cache memories x through z, respectively. During the first step of the processing sequence, a process A is executed by the processor X. During the second step, process A is brought into a waiting state. During the third step, some process other than A is executed by the processor X. During the fourth step, process A is re-dispatched to the processor Z. At this time, the data used in the processing of process A remains in the cache memory x of processor X.

The aforementioned processing sequence involves the following two problems.

First, since the destination of the re-dispatch of process A is the processor Z, the data a in the cache memory x cannot be utilized. The processor Z which executes process A at the fourth step has to read the necessary data out of the main memory. As a result, the processing of processor Z is slowed down. This problem will be hereinafter referred to as a hit rate decline.

Second, cache cancellation may occur. As processor Z reads data similar to data a out of the main memory during the fourth step, the same data may be present in the cache memories x and z at the same time. The data a in the cache memory x are cancelled when processor Z alters the contents of the data a in cache memory z. When cache cancellation occurs, the processing capacity of the system is reduced.

These two problems could be avoided if the destination of the re-dispatch of process A was processor X, which had executed process A immediately before. Thus in a multiprocessor system where each processor has a cache memory, the method which determines the destination of the re-dispatch affects the performance of the system.

Next will be described the prior art. One example of a method to dispatch a process on the basis of the above-described characteristics of a multiprocessor system is disclosed in the U.S. Pat. No. 5,193,172. According to lines 52 through 53 of the second column of the gazette in which this patent is published, one of the objects of this prior art is to reduce the occurrence of cache cancellation accompanying dispatches.

According to this prior art, real pages of the main memory are divided into a plurality of groups. One processor is allocated to each group. A processor allocated to a group preferentially uses the real pages belonging to this group. To each processor are allocated tasks to be executed preferentially by the processor. To each task are allocated real pages to be used in the processing of the task.

Referring to lines 3 through 13 of the eighth column of the gazette, a re-dispatch is performed using the following procedure according to this prior art. The number of real pages allocated to the task to be dispatched is counted for each of said groups. As a result of the counting, the group to which the greatest number of real pages are allocated is determined, and this task is dispatched to the processor having the priority in the use of this group.

According to the above-described dispatching method, unless there is any change in the real pages allocated to each task, this task is re-dispatched to the processor which was executing it in the past. Therefore, the probability of cache cancellation is reduced.

However, this prior art involves the following problem.

The problem is that, in order to manage the aforementioned groups, many procedures have to be executed. This prior art requires alterations of the aforementioned groups during processing in order to allocate an appropriate number of memory pages to each processor. However, according to the statement from line 20 of the sixth column to line 35 of the seventh column of the gazette, any such group alteration requires the execution of many complex procedures, which moreover have to be repeatedly executed.

SUMMARY OF THE INVENTION

An object of the present invention is to provide a process dispatching method which can attain in fewer procedures an improvement in the hit rate of cache memories and a reduction in the occurrence rate of cache cancellation. More specifically, it provides a process dispatching method using the following three strategies.

First strategy: The processor executing the process whose priority is the lowest is the destination of the dispatch.

Second strategy: If there are two or more processes which are the lowest in priority and if the processors executing these processes include the processor which last executed the process to be dispatched, then the processor which last execute the process is the destination of the dispatch.

Third strategy: If the destination of dispatch cannot be determined even by the second strategy, and if the processors executing the processes which are the lowest in priority include a processor executing the dispatch processing, then the processor executing the dispatch processing is the destination of dispatch.

In a preferred embodiment of the invention, a dispatching method using the aforementioned strategies is achieved by a first step to obtain the priority of a first process and the reference number of the processor which executed said first process immediately before the reference number is read out of the process control block for said first process; a second step to select all the processes having the lowest priority among the processes being executed; a third step to compare the priority of the process or processes selected at said second step with that of said first process, and to stop dispatch processing if the priority of the process or processes selected at said second step is higher than that of said first process; a fourth step to dispatch, if only one process was selected at said second step, said first process to the processor executing this selected process; and a fifth step to dispatch, if a plurality of processes were selected at said second step and if any of the processors executing the processes selected at said second step has a reference number identical with that of the processor having executed said first process immediately before, said first process to this processor.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENT

Configuration

Figure 1:
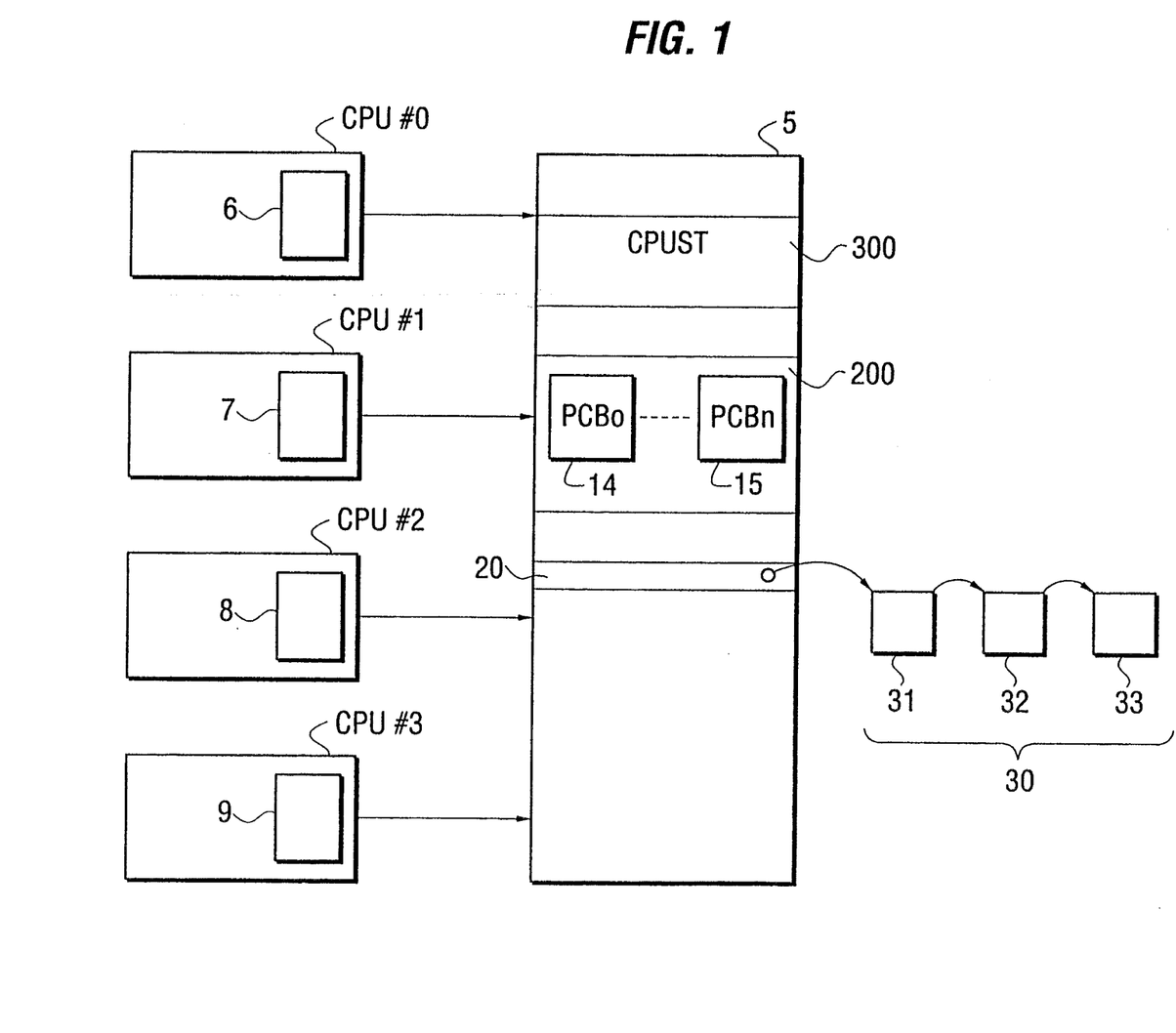
FIG. 1 is a diagram illustrating a preferred embodiment of the invention.

First will be described the configuration of this preferred embodiment. Referring to FIG. 1, this embodiment, which is a multiprocessor system, includes four processors, CPUs #0 through #3. The CPUs #0 through #3 respectively include cache memories 6 through 9. The CPUs #0 through #3 access a common main memory unit 5.

The main memory unit 5 includes a CPU execution state management table 300, a process control block region 200 and a head pointer 20 of the ready queue.

In the process control block region 200 are stored process control blocks (PCBs) 14 and 15.

The head pointer 20 of the ready queue 30 indicates the address process name 31. The process name 31 through 33, linked by pointers, constitute a ready queue. In the following description, the process names 31 through 33 will be called the processes 31 through 33, respectively, for the sake of convenience. The processes 31 and 33 are arranged in an order of priority to be stated below The process 31 at the top of the ready queue 30 is the process having the highest priority in the queue.

Figure 2:
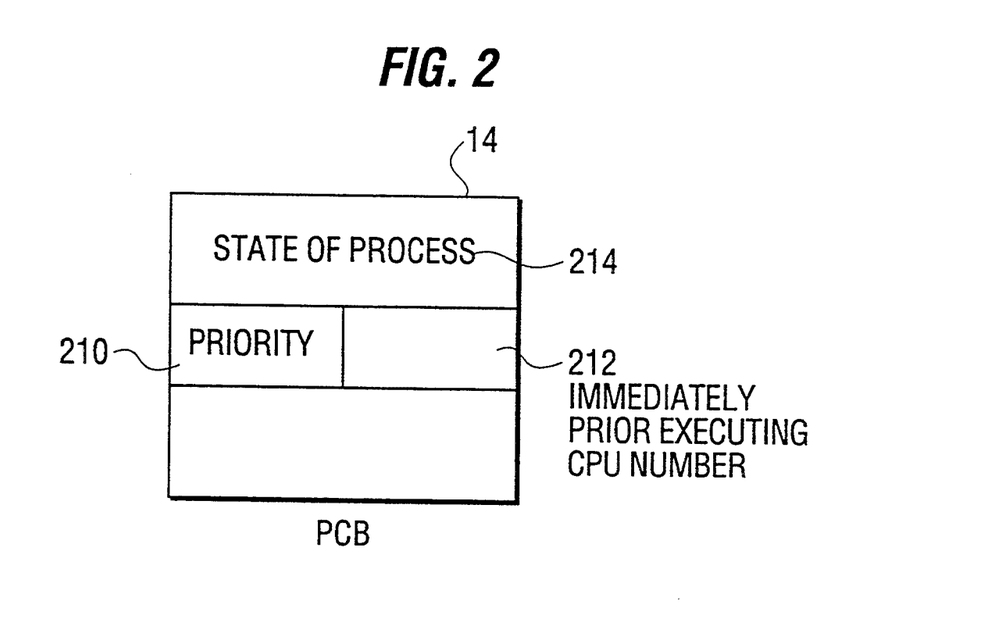
FIG. 2 is a diagram illustrating data to be stored in the PCB 14.

Referring now to FIG. 2, the PCB 14 includes the state of the process 214, a priority 210 and an immediately prior executing CPU number 212i In the state of the process 214 are stored items of information usually included in a PCB other than the priority of the process. For instance, the executing conditions of the process are included in the state of the process 214. The priority 210 determines the relative position of the process in the sequence of executions. The immediately prior executing CPU number 212 is the reference number of the CPU which executed the process immediately before. When the process is in either a waiting state or a ready state, the immediately prior executing CP number 212 is identical with the reference number of the CPU which last executed the process. The updating procedure for the immediately prior executing CPU number 212 will be described elsewhere in this specification.

Figure 3:
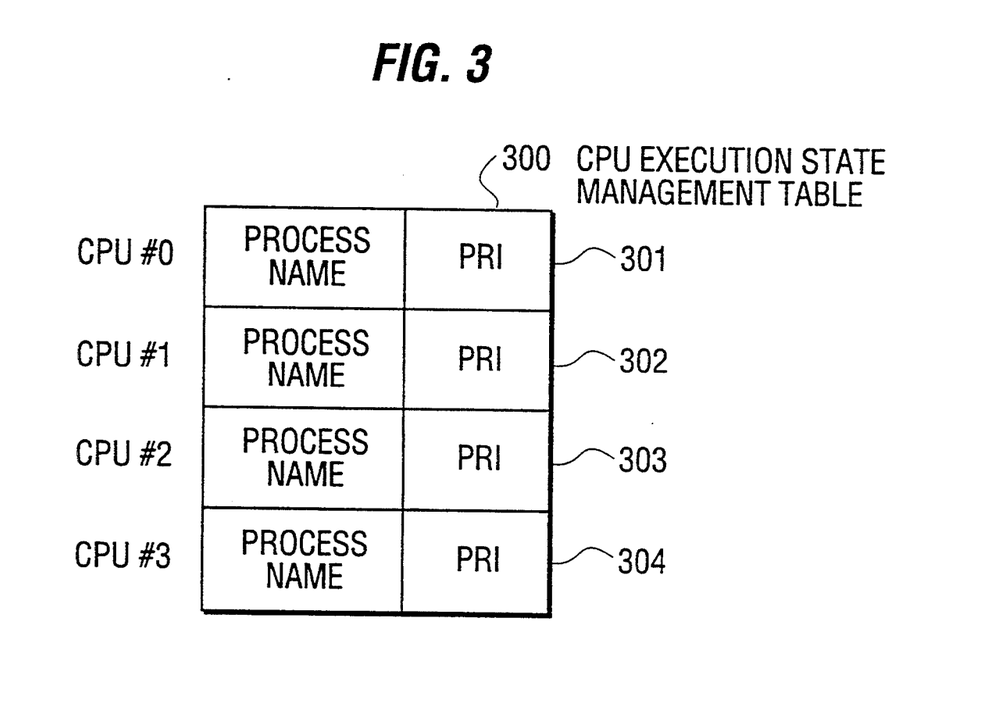
FIG. 3 is a diagram illustrating data to be stored in the CPU execution state management table 300.

Referring to FIG. 3, the CPU execution state management table 300 stores the names and priorities 301 through 304 of the processes being executed by the CPUs #0 through #3.

Next will be described the process dispatching method used by this preferred embodiment. In the dispatching method of this embodiment, two types of dispatch processing and two types of PCB update processing are executed. In these two types of PCB update processing, the immediately prior executing CPU number 212 is updated.

First Dispatch Processing

Figure 4:
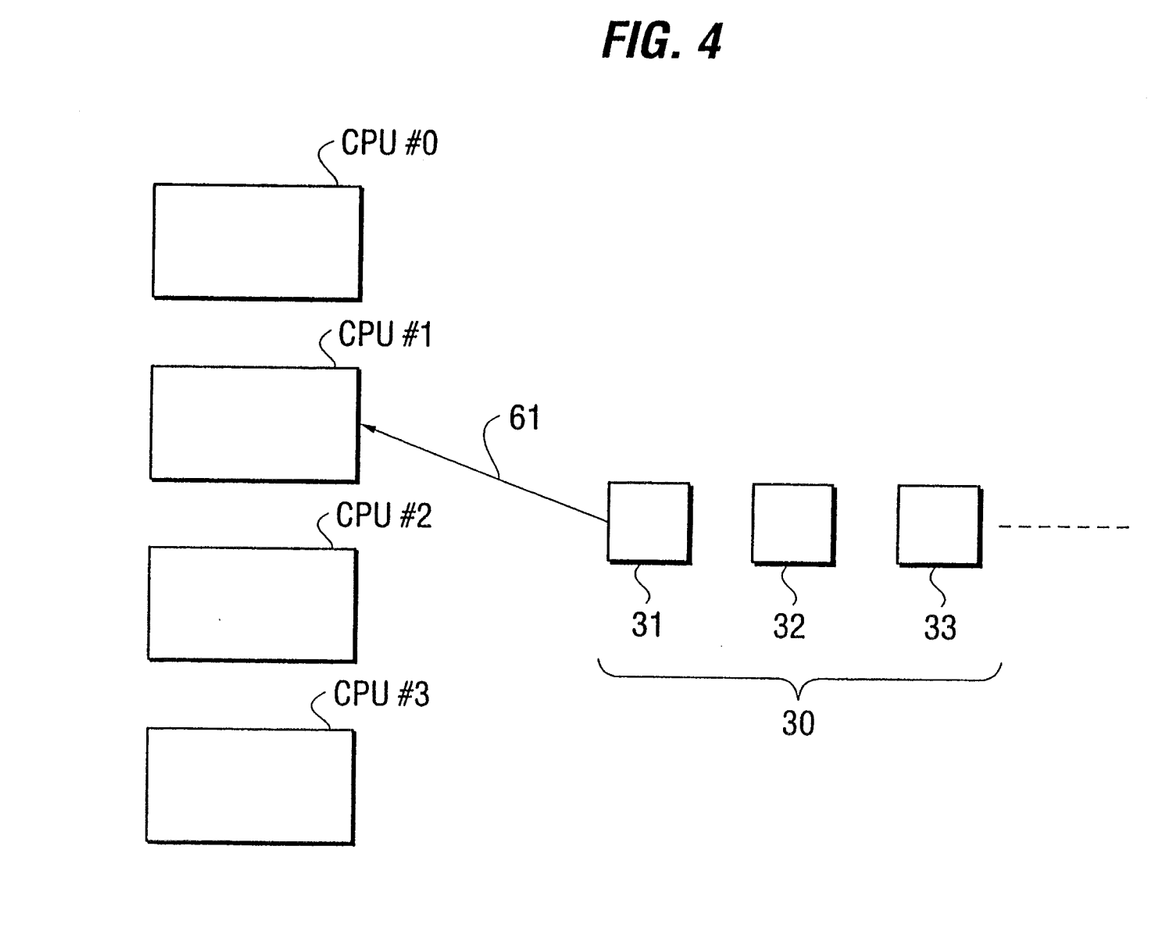
FIG. 4 is a diagram illustrating the operation of first dispatch processing 61.

Referring to FIG. 4, first dispatch processing 61 is executed when the execution of a process has been completed by any one of the CPUs #0 through#3. In the first dispatch processing, the process 31 at the top of the ready queue 30 is dispatched to the CPU which has completed process execution Detailed description of the first dispatch processing is dispensed with, because it is the same as the conventionally accomplished dispatch processing.

First PCB Update Processing

Figure 5:
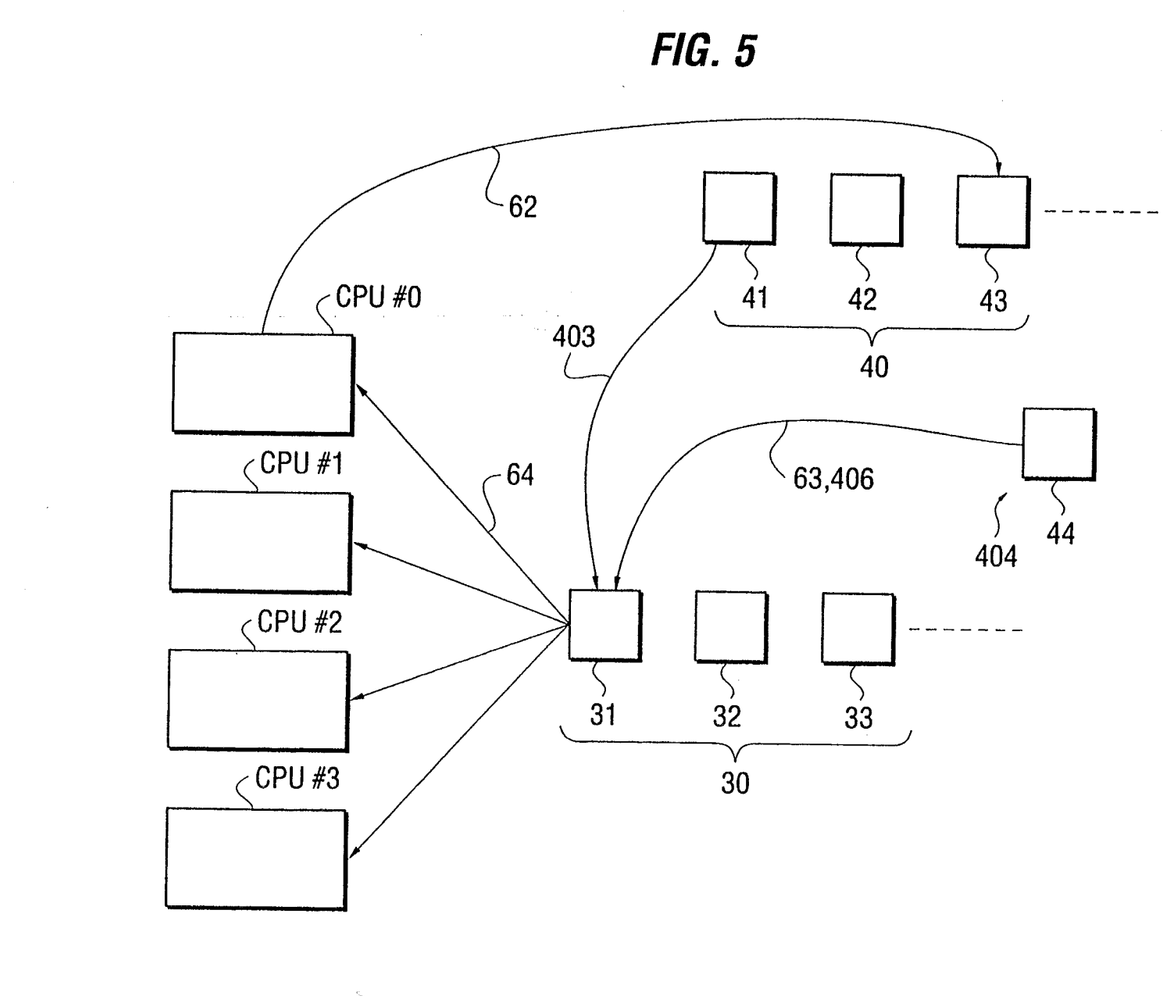
FIG. 5 is a diagram illustrating the operations of first PCB update processing 62, second PCB update processing 63 and second dispatch processing 64.
Figure 6:
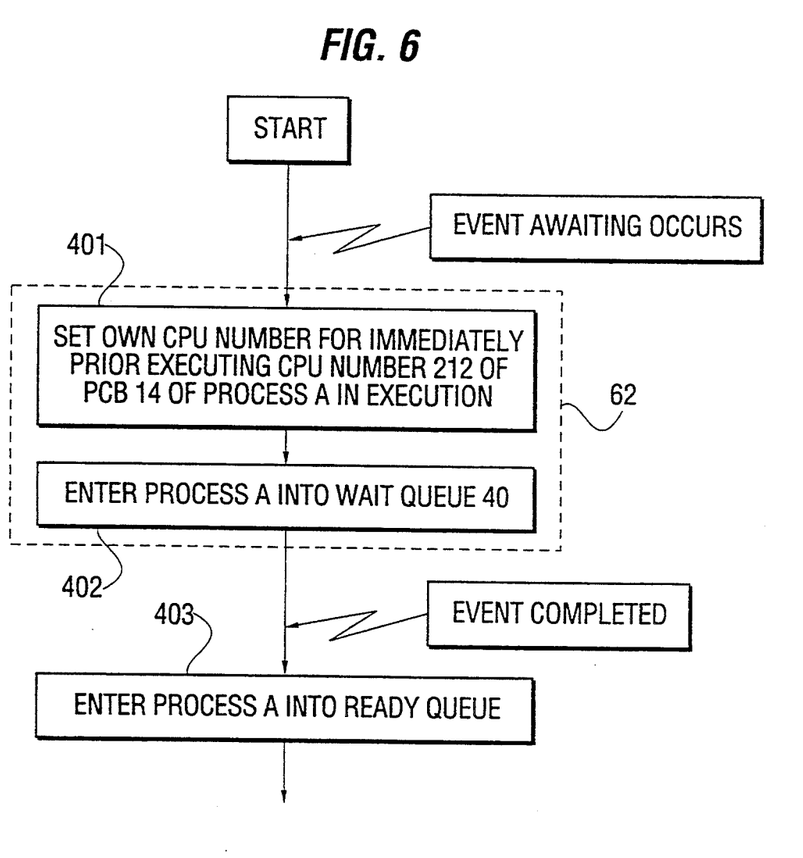
FIG. 6 is a flow chart showing the operation of the first PCB update processing.

Referring now to FIGS. 5 Land 6 together, first PCB update processing 62 is executed when event awaiting occurs in a process being executed by any one of the CPUs #0 through #3. An even may be the completion of inputting or outputting, synchronization with another process or the like.

Referring to FIG. 6, the first PCB update processing 62 consists of steps 401 and 402. In FIG. 6, the process in which event awaiting has occurred is called process A.

During step 401, the reference number of the CPU which has been executing process A is set in the PCB of process A as the CPU number 212 for process A.

During step 402, process A is entered in a wait queue 40. Referring to FIG. 5, processes 41 through 43 awaiting execution are arranged in the wait queue 40. By being entered into the wait queue 40, process A is placed in a waiting state. Upon completion of step 402, the first PCB update processing is ended.

After the end of the first PCB update processing, the event awaited in process A is completed at step 403. The process A is thereby entered into the ready queue 30. As stated above, processes in he ready queue 30 are arranged according to their priorities. Process A is inserted into the ready queue 30 with a position corresponding to its priority. By being entered into the ready queue 30, process A enters a ready state.

Second PCB update Processing

Figure 7:
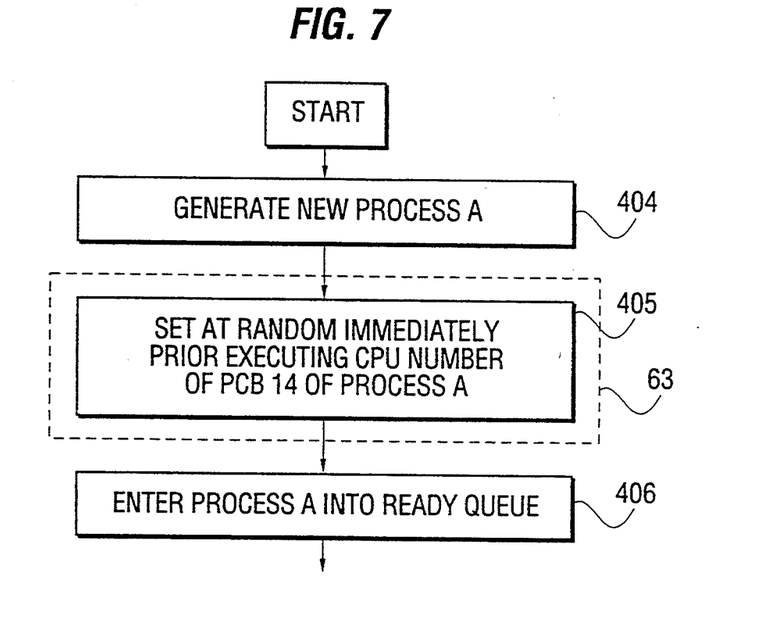
FIG. 7 is a flow chart showing the operation of the second PCB update processing.

Referring to FIGS. 5 and 7 together, the second PCB update processing 63 is executed when a new process is generated. Referring to FIG. 7, the second PCB update processing 63 consists of a step 405.

A new process is generate during step 404. This process will be called the process A for the sake of convenience.

During step 405, a random number R is set in the immediately prior executing CPU number 212 of the process A. The random number R represents the reference number of one of the CPU's included in the system. In the system of this embodiment, R is 0, 1, 2 or 3.

During step 406, the process A is entered into ready queue 30. In the same way as the operation of step 403, process A is inserted into ready queue 30 with a position corresponding to its priority.

Second Dispatch Processing

Figure 8:
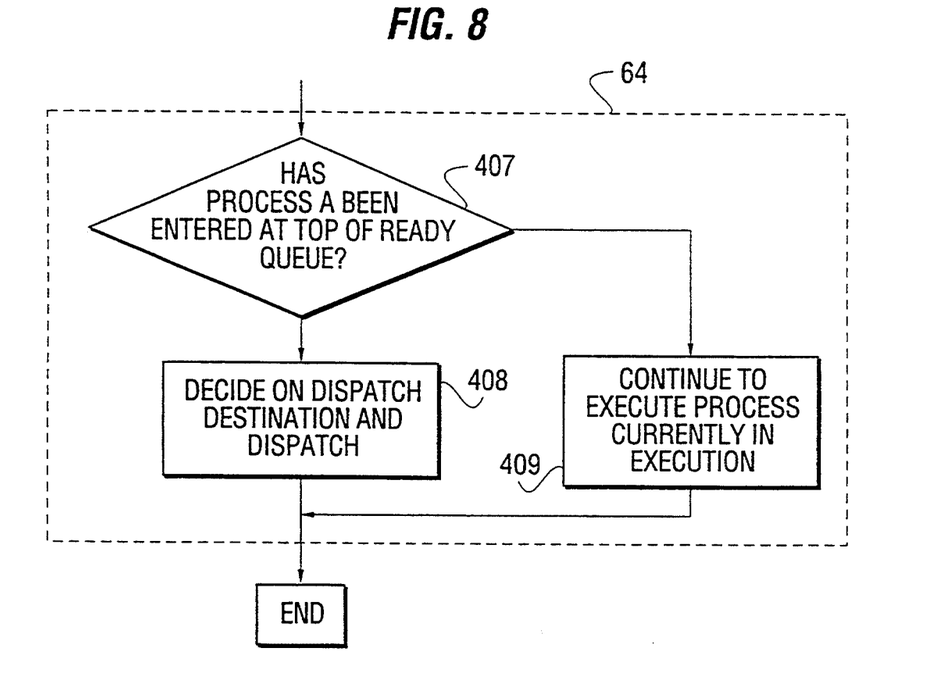
FIG. 8 As a flow chart showing the operation of the second dispatch processing.

Referring now to FIGS. 5 and 8 together, the second dispatch processing 64 is executed by the entry of any process into the ready queue 30.

Referring to FIG. 8, the second dispatch processing 64 consists of steps 407 through 409. Here, the process entered into the ready queue 30 is called process A.

During step 407, it is judged whether or not the process has been entered at the top of the ready queue 30. If the process A has not been entered at the top of the ready queue 30, then step 409 is executed. During step 409, the processes being executed by the CPUs #0 through #3 continue to be executed.

On the other hand, if the process A is entered at the top of the ready queue 30, the step 408 is executed. That the process A has been entered at the top of the ready queue 30 means that the priority of process A is higher than those of other processes in the ready queue 30. Therefore, the priority of process A may be higher than those of the processes being executed by the CPUs #0 through #3. For this reason, if any one the processes being executed by the CPUs #0 through #3 is lower in priority than process A, process A should be preferentially dispatched to a CPU. During step 408, this processing is executed.

During step 408, the destination of the dispatch of process A is determined according to the aforementioned first through third strategies. The dispatch of process is in accordance with the first through third strategies is, as a matter of principle, realized by processing in the following five steps.

Step 1: All the processes in execution having the lowest priority are selected.

Step 2: The priority of the process or processes selected during step 1 is compared with that of process A, and the dispatch processing is stopped if the priority of-any process selected during step 1 is higher than that of process A.

Step 3: If only one process is selected during step 1, process A is dispatched to the processor executing this selected step.

Step 4: If two or more processes are selected during step 1 and if the processors executing the processes selected during step 1 include the processor whose reference number is identical with the immediately prior executing CPU number 212 for process A, then process A is dispatched to this processor.

Step 5: If process A is dispatched to none of the processors during steps 3 and 4, and if the processors selected during step 1 include a processor executing dispatch processing, then process A is dispatched to this processor.

Of the foregoing steps, the steps 3 through 5 correspond to the first through third strategies.

However, during step 408 of this embodiment, processing corresponding to steps 3 through 5 are simultaneously executed.

Step 408

In the description hereinafter, the following denominations will be used: PA represents the process A; #i, the process being executed by a CPU #i, which is the i-th CPU; Cnt, the reference number of the processor executing step 408; PCB(X), the PCB of a process X; PRI(X), the priority of the process X; and LCPU #(X); the immediately prior executing CPU number 212 for the process X.

Next will be explained the variables used in step 408: i, j and k are variables having no specific meanings; minpn, the reference number of the CPU executing the process of the lowest priority, which is determined by using of the aforementioned first through third strategies; and M, the greatest processor number, which is 3 in this embodiment.

Figure 9:
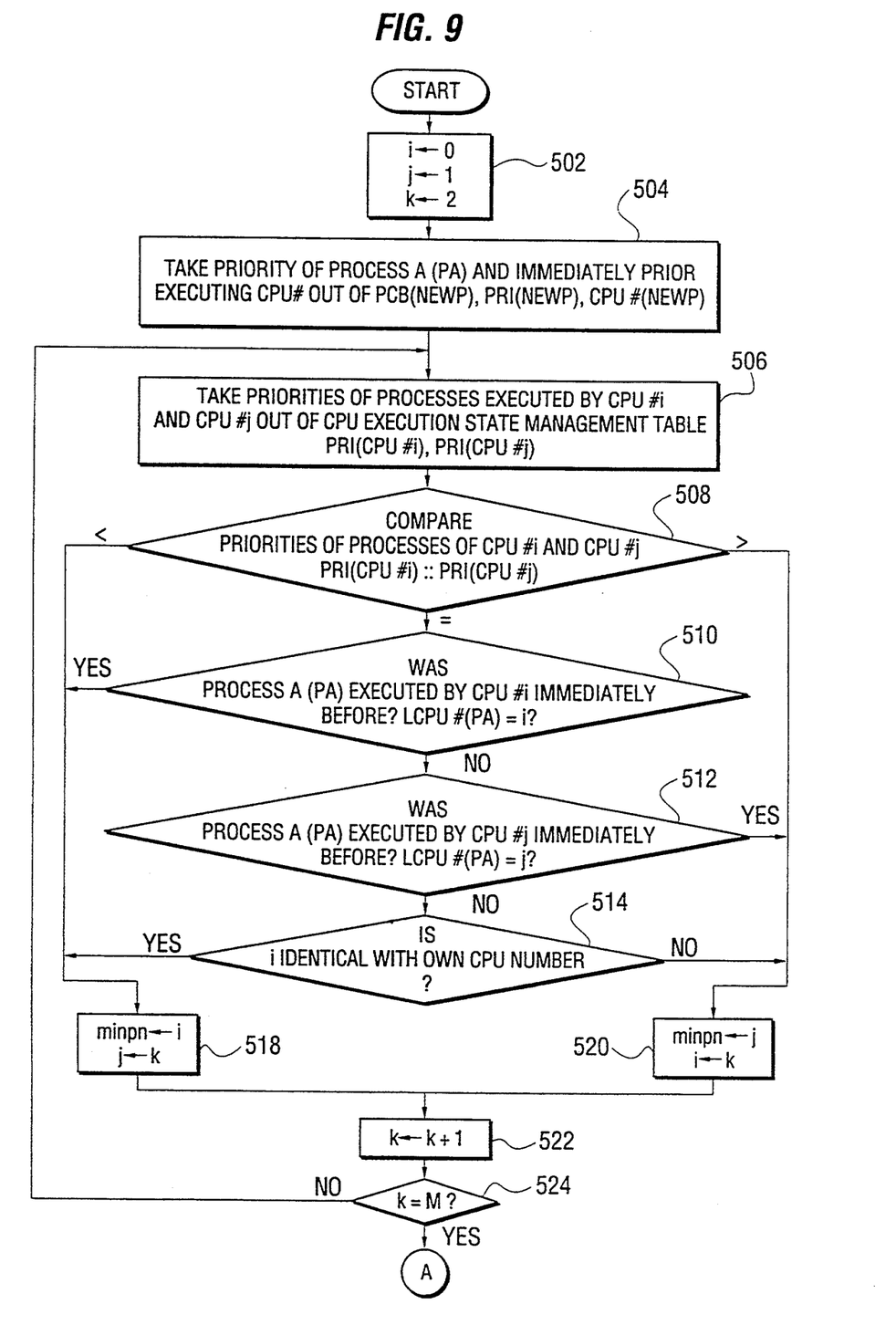
FIG. 9 is a flow chart showing the detailed operation of the step 408.
Figure 10:
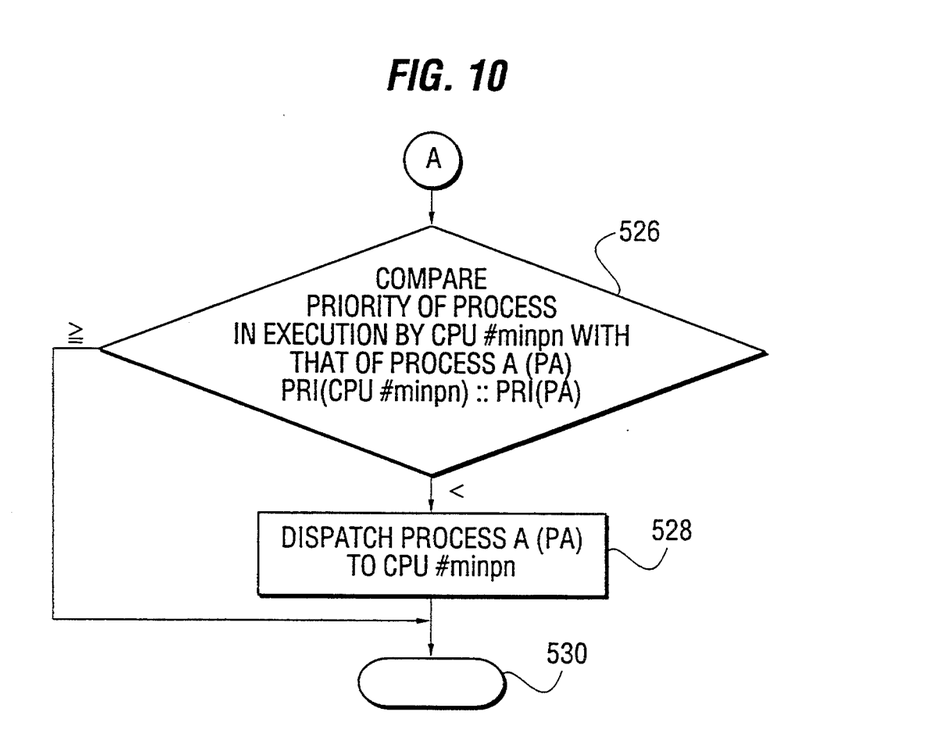
FIG. 10 is a flow chart further showing the detailed operation of the step 408.

Referring to FIGS. 9 and 10 together, step 408 consists of steps 502 through 528. Step 502 can be divided into two large parts. The first part comprises steps 502 through 526. The first part is determines minpn. The second part comprises steps 526 and 528. The second part executes the dispatching.

During step 502, 0, 1 and 2 are respectively substituted for the variables i, j and k.

During step 504, PRI(PA) and LCPU #(PA) are read out of a PCB(PA). According to the above-explained method of denomination, PRI(PA) , LCPU #(PA) and PCB(PA) indicate the priority, immediately prior executing CPU number and PCB of process A, respectively.

During step 506, PRI(#i) and PRI(#j) are read out of the CPU execution state management table 300. According to the above-explained method of denomination, PRI(#i) and PRI(#j) indicate the priority of the process being executed by the CPU #i and that of the process being executed by the CPU #j, respectively.

The step 508 is a step to implement the aforementioned first strategy. During step 508, the priority of the process being executed by CPU #i and that of the process being executed by CPU #j are compared. According to the above-explained method of denomination, the relative magnitudes of PRI(#i) and of PRI(#j) are compared. If PRI(#i) is smaller than the PRI(#j), i.e., if the priority of the process being executed by CPU #i is lower than that of the process being executed by CPU #j, the step 510 is executed. If PRI(#i) is equal to PRI(#j), then step 510 is executed. If PRI(#i) is greater than PRI(#j), step 520 is executed.

Step 510 is a step to implement the aforementioned second strategy. During step 510, it is judged whether or not the reference number LCPU #(PA) of the CPU which last executed the process A is identical with i. If LCPU #(PA) is equal to i, i.e., if process A was last executed by CPU #i, then step 518 is executed. If LCPU #(PA) is not equal to i, then step 512 is executed Step 512 is another step to implement the aforementioned second strategy. During the step 512, it is judged whether or not the reference number L. CPU #(PA) of the CPU which last executed process A is identical with j. If LCPU #(PA) is equal to j, i.e., if the process A was last executed by CPU #j, then step 520 is executed. If LCPU #(PA) is not equal to i, step 514 is executed.

Step 514 is a step to implement the aforementioned third strategy. During step 514, i and Cnt are compared. In other words, it is judged whether or not CPU #i is the very CPU which is executing this processing. If i is equal to Cnt, i.e., if the CPU #i is the very CPU which is executing this processing, step 518 is executed. If i is not equal to Cnt, step 520 is executed.

Step 518 is executed if PRI(#i) is smaller than PRI(#j) at the step 508, if the LCPU #(PA) is equal to i at step 510 or if i is equal to Cnt at step 514. During step 518, i and k are substituted for minpn and j, respectively. Upon completion of the step 518, step 522 is executed.

Step 520 is executed if PRI(#i) is greater than PRI(#j) at step 508, if LCPU #(PA) is equal to j at step 510 or if i is not equal to Cnt at step 514. During step 520, j and k are substituted for minpn and i, respectively. Upon completion of step 528, step 522 is executed.

During step 522, i is incremented.

During step 524, comparison is made to find out whether or not k is equal to M+1. If k is not equal to M+1, step 506 and the following steps are executed again. If k is equal to M+1, the step 526 is executed. At step 524 is completed, the CPU number which is the destination of the process A dispatching, determined in accordance with the above-described first through third strategies, is substituted for the variable minpn.

During step 526, the relative magnitudes of PRI(CPU # minpn) and of the PRI(PA) are compared. Thus, the priority of the process being executed by the CPU # minpn and that of process A are compared. If the PRI(CPU # minpn) is greater than or equal to PRI(PA), step 408 is completed. This takes place when the priority of process A is lower than the lowest priority of the process being executed by any processor. Therefore, process A is not dispatched. When PRI (CPU # minpn) is less than PRI(PA), step 528 is executed.

During step 528, the process A is dispatched to CPU # minpn. Upon completion of the step 528, step 408 is completed.

Completion of step 408 completes the second dispatch processing. Each of the above-described first dispatch processing, second dispatch processing, first PCB update processing and second update processing is executed independent by of one another.

Advantages

As so far described, according to the present invention, the destination of dispatching in the second dispatch processing is determined in accordance with the aforementioned first through third strategies.

As the second strategy is taken into consideration in determining the destination of dispatching, the process has a very high probability of being re-dispatched to the CPU which was executing it immediately before, resulting in an improved cache hit rate and a reduced occurrence rate of cache cancellation.

As the third strategy is taken into consideration in determining the destination of dispatching, the execution speed of the process is increased. Since the processor executing the dispatch processing has already accessed the PCB(PA) of process A, it can begin processing process A earlier than any other processor.

When a new process is to be generated, the immediately prior executing CPU number 212 is determined at random by the second PCB update processing. Therefore, in the second dispatch processing, the dispatch destinations of newly generated processes concentrate on no specific processor.

As hitherto explained, the present invention makes it possible to simultaneously achieve an improved cache hit rate and a reduced occurrence rate of cache cancellation. Therefore, it facilitates improvement of the processing efficiency of a multiprocessor system in which each processor has a cache memory. Furthermore, the invention dispenses with the need to divide memories into groups and to manage these groups.

Other Forms of Embodiment

The present invention may be embodied in other specific forms without departing from the spirit or essential characteristics thereof.

For instance, while the number of CPUs in the abovedescribed preferred embodiment is four, it can be any other number, although the value of the variable M should be altered to a reflect change in the number of CPUs.

The second PCB update processing is not absolutely necessary. If it is dispensed with, newly generated processes should be subjected to conventional dispatch processing instead of the second dispatch processing.

As described above, this preferred embodiment is to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process dispatching method for a multiprocessor system in which each processor of said multiprocessor system has a cache memory, said process dispatching method comprising:

a first step of reading a priority and a prior processor number of a first process from a process control block of said first process, said prior processor number representing a processor of said multiprocessor system in which said first process was last executed;

a second step of selecting at least one lowest priority process, said selected lowest priority process having a lowest priority among processes being executed by said processors of said multiprocessor system;

a third step of discontinuing said process dispatching method when a priority of said at least one lowest priority process selected in said second step is higher than the priority of said first process;

a fourth step of dispatching said first process to a processor of said multiprocessor system which is executing a lowest priority process when only one process has been selected as said lowest priority process by said second step and when a priority of said lowest priority process is lower than the priority of said first process;

a fifth step of dispatching said first process to the processor indicated by said prior processor number of said first process when said prior processor number of said first process represents a processor executing said at least one lowest priority process selected by said second step; and a sixth step of dispatching said first process to a processor executing said process dispatching method when said process dispatching method is being executed by a processor of said multiprocessor system as executing a process selected as having said lowest priority by said second step.

2. A process dispatching method for a multiprocessor system in which each processor of said multiprocessor system has a cache memory, said method comprising:

dispatch processing including, a first step of reading a priority and a prior processor number of a first process from a process control block of said first process, said prior processor number representing the processor in which said first process was last executed, a second step of selecting at least one lowest priority process, said lowest priority process having the lowest priority among the processes being executed by said processors of said multiprocessor system, a third step of discontinuing said process dispatching method when the priority of said at least one lowest priority process selected in said second step is higher than that of said first process, a fourth step of dispatching said first process to the processor of said multiprocessor system which is executing said at least one lowest priority process when only one process has been selected as said lowest priority process by said second step and said lowest priority process has a priority lower than the priority of said first process, and a fifth step of dispatching said first process to a processor indicated by said prior processor number of said first process when said prior processor number of said first process represents a processor of said multiprocessor system which is selected by said second step; and PCB updating processing including a step of assigning a random number as said prior processor number to a newly generated process.

* * * * *